United States Patent
Pedrazzi

[11] Patent Number: 5,929,215
[45] Date of Patent: Jul. 27, 1999

[54] BASIC MONOAZO COMPOUNDS

[75] Inventor: Reinhard Pedrazzi, Allschwil, Switzerland

[73] Assignee: Clariant Finance (BVI) Limited, Tortola, Virgin Islands (Br.)

[21] Appl. No.: 09/111,311

[22] Filed: Jul. 7, 1998

Related U.S. Application Data

[63] Continuation-in-part of application No. 08/823,399, Mar. 24, 1997, abandoned.

[30] Foreign Application Priority Data

Mar. 27, 1996 [GB] United Kingdom ............... 9606453

[51] Int. Cl.⁶ .............. C09B 29/30; D06P 1/41; D21H 21/28
[52] U.S. Cl. .......... 534/604; 534/605; 534/798; 534/803; 8/657; 8/658; 8/919; 106/31.48
[58] Field of Search ................ 534/604, 605, 534/798, 803

[56] References Cited

U.S. PATENT DOCUMENTS

| | | | |
|---|---|---|---|
| 4,273,707 | 6/1981 | Pedrazzi | 534/604 X |
| 4,363,761 | 12/1982 | Pedrazzi | 534/604 |
| 4,367,172 | 1/1983 | Pedrazzi | 534/797 |
| 4,544,737 | 10/1985 | Stohr et al. | 534/604 X |
| 4,594,410 | 6/1986 | Pedrazzi | 534/604 X |
| 4,764,175 | 8/1988 | Dore et al. | 534/803 X |
| 4,771,129 | 9/1988 | Kawashita et al. | 534/803 |
| 4,839,468 | 6/1989 | Nickel et al. | 534/604 |
| 4,975,118 | 12/1990 | Mayer et al. | 534/604 X |

FOREIGN PATENT DOCUMENTS

| | | |
|---|---|---|
| 194885 | 9/1986 | European Pat. Off. . |
| 2915323 | 11/1979 | Germany . |
| 3625576 | 2/1987 | Germany . |

OTHER PUBLICATIONS

International Search Report dated Aug. 5, 1997.

*Primary Examiner*—Fiona T. Powers
*Attorney, Agent, or Firm*—Scott E. Hanf

[57] ABSTRACT

Compounds of Formula I

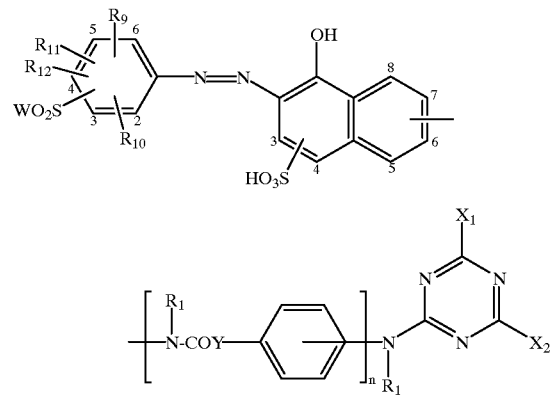

wherein the substituents are as defined in the description, a process of manufacture thereof and a process of dyeing employing said compounds.

9 Claims, No Drawings

BASIC MONOAZO COMPOUNDS

This application is a continuation-in-part of application Ser. No. 08/823,399 filed on Mar. 24, 1997 now abandoned.

The invention relates to basic monoazo compounds containing a sulphonic acid group which compounds are in metal-free or copper complex form, and salts thereof and mixtures of these compounds or complexes which may be in internal or external salt form. They are suitable for use as dye-stuffs.

DE-A-3 625 576 describes basic mono- or disazo compounds, the coupling component of which is a derivative of 1-hydroxynaphthalene-3- or -4-sulphonic acid having in its 6- or 7-position a triazinylamino radical which is substituted by two basic substituents, and the diazo component of which is aniline or a derivative thereof which is mono- or disubstituted whereby the substituent, or one of the substituents, may, inter alia, be an optionally substituted sulphonamido group and whereby said aniline or derivative thereof may, in addition, be substituted by a phenylazo group, the phenyl moiety of which is unsubstituted or monosubstituted by, inter alia, an optionally substituted sulphonamido group.

DE-A-2 915 323 describes, inter alia (cf. Example 79 and Table 5), basic monoazo compounds, the coupling component of which is a derivative of 1-hydroxynaphthalene-3-sulphonic acid having in its 6-position a triazinylamino radical which is substituted by two basic substituents, and the diazo component of which is 2-aminonaphthalene-5-sulphonamide, or aniline or a derivative thereof which is mono- or disubstituted by methoxy, benzoyl, acetyl, phenoxy, methyl, chloro or phenylcarbamoyl.

According to the invention there are provided compounds of formula I

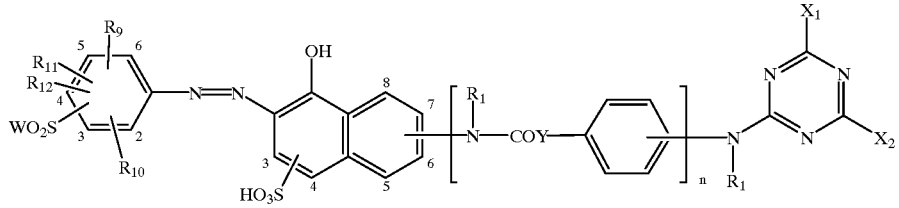

wherein
W is OH or $NR_{13}R_{14}$
Y is NH or a direct bond
$R_9$ is OH, Cl, $C_1$–$C_4$alkyl, $C_2$–$C_4$hydroxyalkyl, $C_2$–$C_4$hydroxyalkoxy, $NH_2$, $NO_2$, COOH, COO($C_1$–$C_4$alkyl), $SO_2NR_{13}R_{14}$, $SO_2OR_1$, $C_1$–$C_4$alkoxy
$R_{10}$ is Cl, $C_1$–$C_4$alkyl, $C_1$–$C_4$alkoxy, NHCO—$C_{1-4}$alkyl, $NO_2$
$R_{11}$ is H, $CH_3$
$R_{12}$ is H, $CH_3$, Cl
$R_{13}$ is H, phenyl, cycloalkyl or $C_1$–$C_6$alkyl optionally substituted by $NR_{16}R_{17}$ or OH;
$R_{14}$ is H, $C_1$–$C_6$alkyl, optionally substituted by $NR_5R_6$ or OH
each $R_1$ is independently H, $C_1$–$C_4$alkyl optionally monosubstituted by OH
n is 0 or 1
$X_1$ and $X_2$ independently of each other is an aliphatic, cycloaliphatic, aromatic or heterocyclic amino group, said amino group comprising a protonatable nitrogen atom or a quaternary ammonium group, and being an aliphatic, cycloaliphatic, aromatic or heterocyclic mono($C_{1-4}$alkyl)-amino group, the $C_{1-4}$alkyl-group being unsubstituted or monosubstituted by halogen, $C_{1-4}$alkoxy, $C_{1-4}$alkyl, phenyl or hydroxy; an aliphatic, cycloaliphatic, aromatic or heterocyclic di($C_{1-4}$alkyl)-amino group, the $C_{1-4}$alkyl-groups being independently unsubstituted or monosubstituted by halogen, $C_{1-4}$alkyl, $C_{1-4}$alkoxy, phenyl or hydroxy; a $C_{5-6}$cycloalkylamino group, the cycloalkyl group being unsubstituted or substituted by one or two $C_{1-2}$alkyl groups; a phenylamino group, the phenyl ring being unsubstituted or substituted by one or two groups selected from halogen, $C_{1-4}$alkyl, $C_{1-4}$alkoxy, hydroxy and phenoxy; or a 5- or 6-membered ring containing one or two hetero atoms, in addition to N, O or S, which heterocyclic ring is unsubstituted or substituted by one or two $C_{1-4}$alkyl groups; or a group Z, where Z is independently selected from

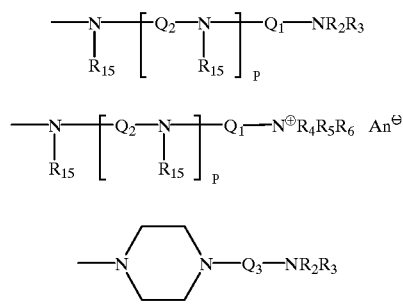

-continued

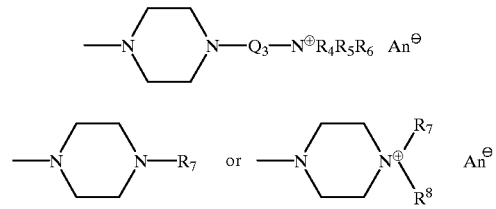

where
p is 0 or an integer 1, 2 or 3,
each $R_{15}$ is independently hydrogen, unsubstituted $C_{1-4}$alkyl or $C_{1-4}$alkyl monosubstituted by hydroxy, halogen, cyano or $C_{1-4}$alkoxy,
each $R_2$ and $R_3$ is independently hydrogen, unsubstituted $C_{1-6}$alkyl, $C_{2-6}$alkyl monosubstituted by hydroxy or cyano, phenyl or phenyl-$C_{1-4}$alkyl, where the phenyl ring of the latter two groups is unsubstituted or substituted by one to three groups selected from chlorine, $C_{1-4}$alkyl, $C_{1-4}$alkoxy, unsubstituted $C_{5-6}$cycloalkyl or $C_{5-6}$cycloalkyl substituted by one to three $C_{1-4}$alkyl groups, or a pyridinium ring, or $R_2$ and $R_3$ together with the nitrogen atom to which they are attached, form a 5- or 6-membered ring containing one to three hetero atoms (in addition to N, one or two further N, O or S), which heterocyclic ring is unsubstituted or substituted by one or two $C_{1-4}$alkyl groups, each $R_4$ and $R_5$ has independently one of significances of $R_2$ and $R_3$, except hydrogen $R_6$ is $C_{1-4}$alkyl or benzyl with the exception that $R_6$ is not benzyl when $R_4$ and $R_5$ have one of the cyclic significations of $R_2$ and $R_3$ or $R_4$, $R_5$ and $R_6$ together with the nitrogen atom to which they are attached, form a pyridinium ring which is unsubstituted or substituted by one or two methyl groups, $Q_1$ is $C_{2-8}$alkylene, $C_{3-6}$alkylene substituted by one or two hydroxy groups, $C_{1-6}$alkylene-1,3- or 1,4-phenylene, or —*NHCOCH$_2$, where * denotes the atom bound to —NR$_{15}$ $Q_2$ is $C_{2-8}$alkylene, $C_{3-6}$alkylene substituted by one or two hydroxy groups, $C_{1-6}$alkylene-1,3- or -1,4-phenylene or 1,3- or 1,4-phenylene, $Q_3$ is $C_{2-8}$alkylene, $R_7$ is hydrogen, unsubstituted $C_{1-6}$alkyl or $C_{1-6}$alkyl monosubstituted by hydroxy, cyano, chlorine or phenyl, $R_8$ is unsubstituted $C_{1-6}$alkyl or $C_{1-6}$alkyl monosubstituted by hydroxy, cyano or chlorine, and An$^\ominus$ is a non-chromophoric anion;

$R_{16}$ and $R_{17}$ is independently hydrogen, unsubstituted $C_{1-4}$alkyl, $C_{1-4}$alkyl monosubstituted by hydroxy or cyano, phenyl or phenyl-$C_{1-4}$alkyl, where the phenyl ring of the latter two groups is unsubstituted or substituted by one to three groups selected from chlorine, $C_{1-4}$alkyl, $C_{1-4}$alkoxy, unsubstituted $C_{5-6}$cycloalkyl or $C_{5-6}$cycloalkyl substituted by one to three $C_{1-4}$alkyl groups, a primary, secondary or tertiary amino-$C_{1-4}$alkyl group, the alkyl group preferably being propyl, or a pyridine ring, which optionally is substituted the compounds being in internal or external salt form.

Preferably the compounds of formula I above, are in metal-free form in which n is 0 or 1. It is preferred that the substituted triazinyl radical is attached to the naphthol radical at the 6 or 7 position. It is also preferred that the sulphonic acid group is attached at the 3-position of the naphthol radical Preferably, n is 0.

Any alkyl or alkylene present is linear or branched unless indicated to the contrary. In any hydroxy- or alkoxy-substituted alkyl or alkylene group which is linked to a nitrogen atom, the hydroxy or alkoxy group is bound to a carbon atom other than to the $C_1$-atom. In any alkylene group substituted by two hydroxy groups, the hydroxy groups are bound to different carbon atoms.

Any alkyl as $R_1$ preferably contains 1 or 2 carbon atoms, and is more preferably methyl. Any alkyl monosubstituted by hydroxy is preferably linear or branched $C_{1-3}$alkyl.

$R_1$ is preferably $R_{1a}$, where each $R_{1a}$ is independently hydrogen, methyl, ethyl or 2-hydroxyethyl.

In a further preferred embodiment of the invention the $R_9$ and $R_{10}$ on the phenyl ring attached to the azo group, are independently selected from the group consisting of $CH_3$, $OCH_3$, $OC_2H_5$, Cl, $NO_2$.

In a more preferred embodiment of the invention, the substitution pattern of the phenyl group is one of the following:

2-nitro-3-chloro-4-sulphonamido, 2,5-dimethyl-sulphonamido, 5-chloro-2-methyl-sulphonamido, 2-methoxy-5-methyl-sulphonamido, 2,5-dimethoxy-sulphonamido, 2,5-dichloro-sulphonamido, 2-nitro-5-chloro-4-sulphonamido, 2-ethoxy-5-methyl-4-sulphonamido, 2,6-dimethyl-4-sulphonamido, 2,6-dichloro-4-sulphonamido, 2,6-dinitro-4-sulphonamido, 2,6-dichloro-3-methyl-4-sulphonamido, 2,3,6-trichloro-4-sulphonamido, 2,6-dinitro-3-methyl-4-sulphonamido, 2,3,5,6-tetramethyl-4-sulphonamido, 2,6-dimethyl-3-sulphonamido, 2-chloro-6-methyl-3-sulphonamido, 5,6-dimethyl-3-sulphonamido, 5-methyl-6-chloro-3-sulphonamido, 5-chloro-6-methyl-3-sulphonamido, 5-nitro-6-methyl-3-sulphonamido, 6-chloro-4-methyl-3-sulphonamido, 4-chloro-6-methyl-3-sulphonamido, 4,6-dichloro-3-sulphonamido, 5-nitro-4-methyl-3-sulphonamido, 4-nitro-5-methoxy-3-sulphonamido, 5-chloro-4-methyl-2-sulphonamido, 5-methyl-4-methoxy-2-sulphonamido, 4,5-dimethoxy-2-sulphonamido, 4chloro-5-methyl-2-sulphonamido, 4-chloro-5-methoxy-2-sulphonamido, 4,5-dichloro-2-sulphonamido, 4,6-dichloro-2-sulphonamido, 4,6-dinitro-2-sulphonamido, 3,5-dimethyl-2-sulphonamido, 3,5-dichloro-2-sulphonamido, 3,4-dichloro-2-sulphonamido, 3,4,5-trichloro-2-sulphonamido, 3,4,6-trichloro-2-sulphonamido.

In a more preferred embodiment of the invention, $WO_2S$— on the phenyl is a 4-sulphonamido, in a less preferred embodiment it is a 3-sulphonamido and in a still less preferred embodiment, it is a 2-sulphonamido group.

Particularly preferred 4-sulphonamido compounds selected from the above list are any one of the following: 2-nitro-3-chloro-4-sulphonamido, 2,5-dimethyl-sulphonamido, 5-chloro-2-methyl-sulphonamido, 2-methoxy-5-methyl-sulphonamido, 2,5-dimethoxy-sulphonamido, 2,5-dichloro-sulphonamido, 2-nitro-5-chloro-4-sulphonamido and 2-ethoxy-5-methyl-4-sulphonamido.

Where $X_1$ or $X_2$ is an aliphatic amino group, such group is preferably a mono($C_{1-4}$alkyl)- or di($C_{1-4}$alkyl)-amino group in which each alkyl group is independently unsubstituted or monosubstituted by halogen (particularly chlorine or bromine), $C_{1-4}$alkoxy, phenyl or hydroxy, of which substituents hydroxy is most preferred. Any cycloaliphatic amino group as $X_1$ or $X_2$ is preferably a $C_{5-6}$cycloalkyl-amino group in which the cycloalkyl group is unsubstituted or substituted by one or two $C_{1-2}$alkyl groups.

Where $X_1$ or $X_2$ is an aromatic amino group, such group is preferably a phenylamino group in which the phenyl ring is unsubstituted or substituted by one or two groups selected from halogen (more preferably chlorine), $C_{1-4}$alkyl, $C_{1-4}$alkoxy, hydroxy and phenoxy.

Where $X_1$ or $X_2$ is a heterocyclic amino group, it is preferably a saturated 5- or 6-membered ring containing one or two hetero atoms (that is in addition to N, O or S), which heterocyclic ring is unsubstituted or substituted by one or two $C_{1-4}$alkyl groups. More preferably it is a piperidino- or morpholino-group.

Any unsubstituted $C_{1-6}$alkyl group as $R_2$ or $R_3$ is preferably methyl or ethyl. Any substituted $C_{2-6}$alkyl group as $R_2$ or $R_3$ is preferably ethyl or propyl monosubstituted by cyano or hydroxy with the substituent in the 2- or 3-position.

Any phenyl as $R_2$ or $R_3$ is preferably unsubstituted. Any phenylalkyl group is preferably benzyl, the phenyl ring of which is preferably unsubstituted. Any cycloalkyl as $R_2$ or $R_3$ is preferably cyclohexyl; any alkylsubstituted cycloalkyl is preferably cyclohexyl substituted by one to three methyl groups.

$R_2$ or $R_3$ are preferably $R_{2a}$ or $R_{3a}$, where each $R_{2a}$ or $R_{3a}$ is independently hydrogen, unsubstituted $C_{1-4}$alkyl, linear hydroxy-$C_{2,3}$alkyl, phenyl or benzyl, or a pyridinium ring.

More preferably, $R_2$ or $R_3$ are $R_{2b}$ or $R_{3b}$, where each $R_{2b}$ or $R_{3b}$ is independently hydrogen, unsubstituted $C_{1-4}$alkyl or 2-hydroxethyl, or a pyridinium ring.

Most preferably, $R_2$ and $R_3$ are $R_{2c}$ and $R_{3c}$ respectively, where each $R_{2c}$ and $R_{3c}$ is independently hydrogen, methyl or ethyl.

It is particularly preferred that $R_2$ and $R_3$ having a non-cyclic significance are identical groups.

$R_4$ and $R_5$ are preferably $R_{4a}$ and $R_{5a}$ respectively, where each $R_{4a}$ and $R_{5a}$ is independently unsubstituted $C_{1-4}$alkyl, linear hydroxy-$C_{2-3}$alkyl or benzoyl, or $R_{4a}$ and $R_{5a}$ together with the nitrogen to which they are attached form a piperidine-, morpholine-, piperazine- or N-methyl-piperazine-ring.

More preferably, $R_4$ and $R_5$ are $R_{4b}$ and $R_{5b}$ respectively where each $R_{4b}$ and $R_{5b}$ is independently unsubstituted $C_{1-4}$alkyl or 2-hydroxy-ethyl.

Any alkyl as $R_6$ is preferably methyl or ethyl, especially methyl.

In a preferred embodiment of the invention, Z above has the meaning $Z_a$, wherein each $Z_a$ is independently a group selected from

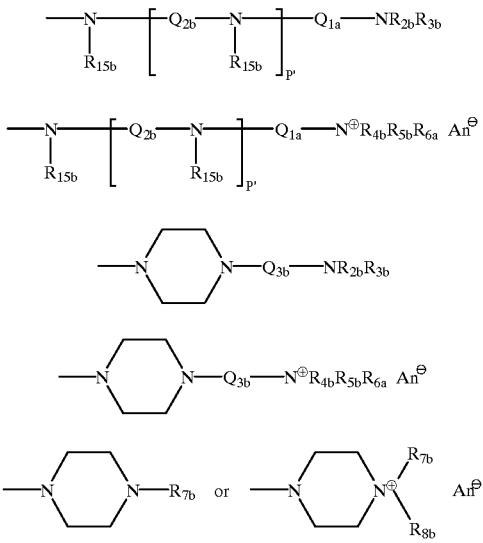

in which p' is 0 or 1, $R_{15b}$ is hydrogen, methyl or 2-hydroxyethyl, $Q_{1a}$ is —*NHCOCH$_2$-, wherein *denotes the atom bound to —NR$_{15b}$, unsubstituted $C_{2-6}$alkylene, monohydroxy-substituted $C_{3-4}$alkylene, —(CH$_2$)$_{1-4}$-1,3- or -1,4-phenylene, or 1,3-or 1,4-phenylene, each $Q_{2b}$ and $Q_{3b}$ is a linear $C_{2-6}$alkylene group, each $R_{2b}$ and $R_{3b}$ is independently hydrogen, unsubstituted $C_{1-4}$alkyl or 2-hydroxyethyl, or a pyridinium ring, each $R_{4b}$ and $R_{5b}$ is independently unsubstituted C1–4alkyl or 2-hydroxy-ethyl and $R_{6a}$ is $C_{1-4}$alkyl or benzyl or $R_{4b}$, $R_{5b}$ and $R_{6a}$ together with the nitrogen to which they are attached form a pyridinium ring which is unsubstituted or substituted by one or two methyl groups, $R_{7b}$ is hydrogen, methyl, ethyl or 2-hydroxyethyl, $R_{8b}$ is methyl, ethyl or 2-hydroxyethyl, and An$^\ominus$ is a non-chromophoric anion.

The present invention further provides a process for the preparation of compounds of formula I comprising reacting the diazonium salt of an amine of formula II, having the following formula:

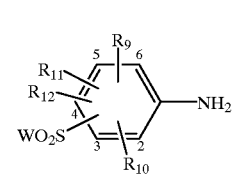

in which WO$_2$S, $R_9$, $R_{10}$, $R_{11}$ and $R_{12}$ are as above defined and preferably being so positioned as above defined, so as to give a preferred compound of Formula I as above disclosed, with a compound of formula III, having the following formula:

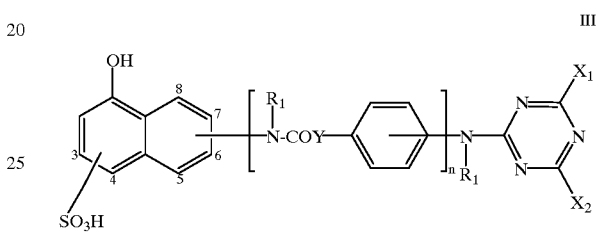

in which $R_1$, $X_1$, $X_2$ and Y are as above defined, with the preference with respect to the positioning of the SO$_3$H being as above mentioned.

Diazotisation and coupling may be effected in accordance with conventional methods. The coupling reaction advantageously is carried out in an aqueous reaction medium in a temperature range of from 0–60° C., preferably at 20–50° C., and in a pH range of from 3 to 9, preferably at pH 4 to 6. All temperatures are given in degrees Celsius.

A metal-free compound of formula I, in which one of the ortho-positions of the phenyl group with respect to the carbon atom of the >C—N═N-naphthol radical is unsubstituted or substituted by halogen, hydroxy or $C_{1-4}$alkoxy, may be converted into a 1:1 copper complex in accordance with known methods. This coppering may be carried out by reacting an appropriate metal-free compound of formula I with a copper-donating compound which is employed in such an amount so as to provide at least one equivalent of copper per equivalent of monoazo compound to be metallized.

Suitably, the 1:1 copper complexes may be prepared either by oxidative coppering, preferably at 40–70° C. and at pH 4 to 7 in the presence of copper(II) salts, or using copper powder in the presence of hydrogen peroxide or any other conventional oxidizing agents; or preferably by demethylation coppering in the presence of copper(II) salts, preferably at pH 2 to 6 and at elevated to boiling temperature with the addition of metal acetates, or at pH 6 to 11 at elevated to boiling temperature with the addition of an aqueous ammonia solution or an aliphatic amine.

The compounds of formula I thus obtained may be isolated in accordance with known methods.

The compounds (or complexes) of formula I containing free basic groups may be converted wholly or in part into water-soluble salts by reacting with any one of the above-mentioned inorganic or organic acids.

The starting compounds, the amines of formula II, are either known or may be prepared in accordance with known methods from available starting materials. The compounds of formula III may be prepared by step-wise replacement of the chlorine atoms of cyanuric chloride whereby in a first and second step, cyanuric chloride is reacted with a diamine of formulae IV and V (as hereinafter defined), respectively,

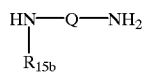  IV

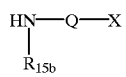  V in which $R_{15b}$ is as above defined and Q and X have the following meanings: Q may have any of the meanings of $Q_1$, $Q_2$ or $Q_3$ above; and X has the meaning of $X_1$.

In the case where identical diamino groups have to be introduced, this first and second steps may be combined into one step. Suitably, the single step is carried out at temperatures of from 0–30° C. and preferably at pH 4–6.

Where different diamino groups have to be introduced, suitably, the diamine showing the higher selectivity with respect to the condensation reaction is introduced in the first step at a temperature of preferably 0–20° C. more preferably 0–5° C. Both condensation steps may be carried out using the conventional reaction medium where the upper limit of pH is 7. The second step is preferably carried out at 10–40° C., more preferably 12–30° C.

The final third step, the condensation with the aminonaphthol component, is carried out at elevated temperatures in the range of 60–100° C. and at pH 2–3.

The starting compounds of formulae IV and V are either known or may be prepared in accordance with known methods from available starting materials.

The compounds and complexes according to the invention, in acid addition salt form or quaternary ammonium salt form, may be used for dyeing cationic dyeable materials such as: homo- or mixed-polymers of acrylonitrile, acid modified polyester or polyamide; wool; leather including low affinity vegetable-tanned leather; cotton; bast fibers such as hemp, flax, sisal, jute, coir and straw; regenerated cellulose fibers, glass or glass products comprising glass fibers; and substrates comprising cellulose for example paper and cotton. They may also be used for printing fibers, filaments and textiles comprising any of the above mentioned materials in accordance with known methods. Printing may be effected by impregnation of the material to be printed with a suitable printing paste comprising one or more compounds of the present invention. The type of printing paste employed, may vary depending on the material to be printed. Choice of a suitable commercially available printing paste or production of a suitable paste, is routine for one skilled in the art. Alternatively the compounds of the present invention may be used in the preparation of inks suitable for example for jet printing, in accordance with conventional methods.

Most preferably, the dyestuffs are used for dyeing or printing of paper e.g., sized or unsized, wood-free or wood-containing paper or paper-based products such as cardboard. They may be used in continuous dyeing in the stock, dyeing in the size press, in a conventional dipping or surface coloring process. The dyeing and printing of paper is effected by known methods.

The dyeings and prints and particularly those obtained on paper, show good fastness properties.

The compounds of formula I may be converted into dyeing preparations. Processing into stable liquid, preferably aqueous, or solid (granulated or powder form) dyeing preparations may take place in a generally known manner. Advantageously suitable liquid dyeing preparations may be made by dissolving the dyestuff in suitable solvents such as mineral acids or organic acids, e.g., hydrochloric acid, sulphuric acid, phosphoric acid, formic acid, acetic acid, lactic acid, glycolic acid, citric acid and methanesulphonic acid. Furthermore formamide, dimtheylformamide, urea, glycols and ethers thereof, dextrin or addition products of boric acid with sorbit may be used together with water, optionally adding an assistant, e.g. a stabilizer. Such preparations may be obtained, for example, as described in French patent specification No. 1,572,030.

The compounds of formula I (in the corresponding salt form) have good solubility especially in cold water. Owing to their high substantivity the compounds of the present invention exhaust practically quantitatively and show a good build-up power. They can be added to the stock directly, i.e. without previously dissolving, as either a dry powder or granulate, without reducing the brilliance or the yield of color. They can also be used in soft water without loss of yield. They do not mottle when applied on paper, are not inclined to give two-sided dyeing on paper and are practically insensitive to filler or pH variations. They operate over a broad pH range, in the range of from pH 3 to 10. When producing sized or unsized paper, the waste water is essentially colorless. This feature, which is extremely important from an environmental view-point, when compared with similar known dyes, shows a marked improvement. A sized paper dyeing when compared with the corresponding unsized paper dyeing does not show any decrease in strength.

The paper dyeings or printings made with the compounds, in particular the metal-free forms, according to the invention are clear and brilliant and have good light fastness: On exposure to light for a long time, the shade of the dyeing fades tone in tone. They show very good wet fastness properties; being fast to water, milk, fruit juice, sweetened mineral water, tonic water, soap and sodium chloride solution, urine etc. Furthermore, they have good alcohol fastness properties. The wet fastness properties are improved compared to known dyes showing otherwise similar properties. They do not exhibit a tendency towards two-sidedness.

Paper dyed or printed with the compounds of the present invention can be bleached either oxidatively or reductively, a feature which is important for the recycling of waste and old paper/paper products. It has surprisingly been found that the dyes of the present invention demonstrate excellent bleachability, particularly when bleaching is carried out reductively. This property, together with the improved back-water results and wet-fastness, shows a marked improvement over known dyes having otherwise similar properties.

The compounds of the present invention may also be used to dye paper containing wood-pulp where even dyeings, having good fastness properties are obtained. Furthermore, they may be used for the production of coated paper in accordance with known methods. Preferably when coating, a suitable filler, for example kaolin, is employed in order to give a one-side coated paper.

The compounds of the present invention are also suitable for dyeing in combination with other dyes for example other cationic or anionic dyes. The compatibility of the compounds of the present invention when used as a dye in mixtures with other commercially available dyes, may be determined according to conventional methods. The thus obtained dyeings have good fastness properties.

The invention further provides a substrate which has been dyed or printed with a compound of the present invention. The substrate may be selected from any of the above mentioned substrates. A preferred substrate is a substrate comprising cellulose such as cotton or paper or paper based product.

The invention further provides a preferred process of dyeing paper comprising the continuous introduction into a stock solution which is being constantly agitated, of a dye of the present invention.

The invention yet further provides use of a compound of the present invention for dyeing or printing any of the abovementioned substrates.

The following Examples further serve to illustrate the invention. In the Examples all parts and al percentages are by weight or volume, and the temperatures given are in degrees Celsius, unless indicated to the contrary.

EXAMPLE 1

15 parts 1-amino-2-methoxy-5-methylbenzene-4-sulfonamide were dissolved in 200 parts water comprising 20 parts 28% HCl and diazotized at 0–5° C. with 50 parts of 10% sodium nitrate solution. 34 parts sodium acetate were added to the solution 1a, which contains the coupling component of formula

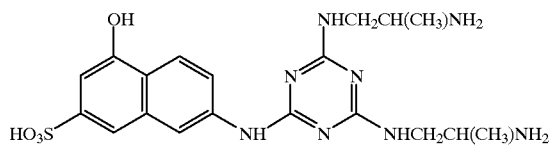

whereby the pH rises to pH 4–5. The diazotizing solution is added thereto and coupling occurs at 5–10° C. The pH is kept a t 4.5–5 using strong sodium hydrogen carbonate. After 3 hours it brought to pH 10 with 30% NaOH and the precipitated dyestuff is filtered off. A dyestuff of the following formula is obtained.

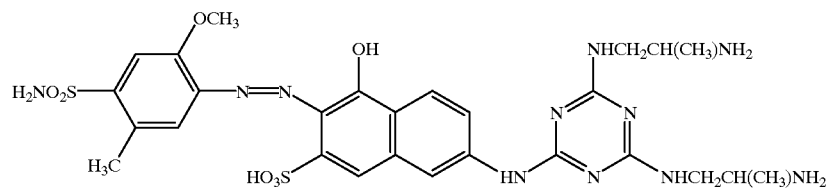

The dyestuff is very soluble in dilute acids, particularly organic acids such as formic acid, lactic acid, acetic acid and methoxyacetic acid. The solution dyes paper in brilliant scarlet nuances. The obtained dyes show excellent light stability and wet fastness (against water, alcohol, milk, soapy water, sodium chloride solution, tonic water, urine etc.) and demonstrate excellent properties with respect to two-sidedness. Furthermore they bleach very well, either oxidatively or reductively.

EXAMPLE 1A

Production of Coupling Component 14.8 parts 1,2-Diaminopropane in 100 parts ice water were brought to pH 3–5 with 46 parts 30% HCl. 18 parts cyanuric chloride were added at 0–3° C. with good stirring. The pH was kept at 5–5.5 for 5 hours using 53 parts 30% NaOH. The temperature of the reaction solution should at the end, be about 25–30° C. Thereafter 21 parts 2-Amino-5-hydroxynaphthaline-7-sulphuric acid were added thereto. The suspension is warmed to 80° C. with stirring and kept at a pH of 2–2.5 with 13 parts 30% NaOH. A lightly cloudy solution results. After 1 h the reaction is complete.

EXAMPLE 1B 18.4 parts cyameric chloride were stirred into 20 parts water and 50 parts ice. Thereafter at a temperature between 0–5° C., 11 parts N-methylpiperazine are added drop wise over 3 h. Stirring is continued for 1 h and thereafter an amine solution of pH 6, comprising 7.4 parts 1,2-Diaminopropane, 40 parts ice and ca. 20 parts 30% HCl is added thereto. The pH is maintained at 6 for a further 5 h, whereby the temperature rises to 25–30° C. Then 21.5 parts 2-amino-5-hydroxynaphthaline-7-sulphuric acid is added. The temperature is brought to 80° C. and kept at this temperature for 1 h, the pH being kept at 2–2.5 using 20% NaOH-carbonate solution. The resulting solution comprises the following coupling component.

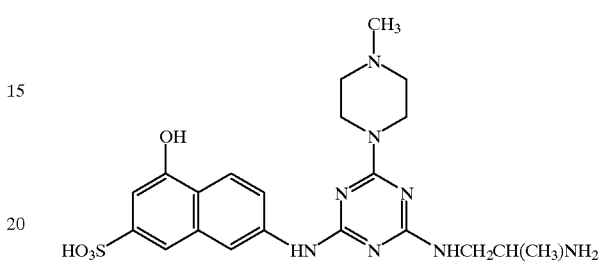

The above coupling component can be used in an analogous manner as in Example 1a above for the production of dyestuffs.

In the following table, several coupling components are given:

| | $X_1$ | $X_2$ |
|---|---|---|
| 1c | 1,2-Diaminopropane | Dimethylaminopropylamine |
| 1d | 1,2-Diaminopropane | Diethylaminopropylamine |
| 1e | 1,2-Diaminopropane | N-Hydroxyethylpiperazine |
| 1f | 1,2-Diaminopropane | Piperazine |
| 1g | 1,2-Diaminopropane | N-Methylpiperazine |
| 1h | 1,2-Diaminopropane | N-Aminoethylpiperazine |
| 1i | Propylenediamine | Dimethylaminopropylamine |
| 1j | Ethylenediamine | Dimethylaminopropylamine |
| 1k | N-Aminoethylpiperazine | N-Aminoethylpiperazine |
| 1l | N-Methylpiperazine | N-Methylpiperazine |
| 1m | N-Hydroxyethylpiperazine | N-Hydroxyethylpiperazine |
| 1n | N-Hydroxyethylpiperazine | N-Aminoethylpiperazine |
| 1o | N-Hydroxyethylpiperazine | Dimethylaminopropylamine |
| 1p | Dimethylaminopropylamine | Diethylaminopropylamine |
| 1q | Diethylaminopropylamine | Diethylaminopropylamine |
| 1r | Piperazine | Diethylaminopropylamine |

EXAMPLES 2–16

In an analogous manner as described in Examples 1 and 1a–r, using the appropriate starting material, further compounds of formula I are produced. The compounds have the formula

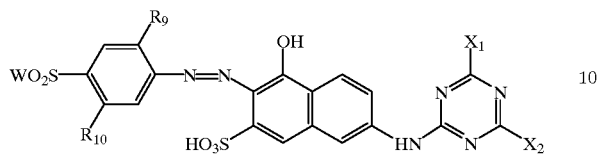

in which the symbols have the meaning given in the following table.

| No. | W | $R_9$ | $R_{10}$ | $X_1$ | $X_2$ |
|---|---|---|---|---|---|
| 2 | OH | $OCH_3$ | $CH_3$ | $NHCH_2CH(CH_3)NH_2$ | $NHCH_2CH(CH_3)NH_2$ |
| 3 | $NHCH_3$ | $OCH_3$ | $CH_3$ | $NHCH_2CH(CH_3)NH_2$ | $HCH_2CH(CH_3)NH_2$ |
| 4 | $NHC_2H_4OH$ | $OCH_3$ | $CH_3$ | $NHCH_2CH(CH_3)NH_2$ | $NHCH_2CH(CH_3)NH_2$ |
| 5 | $NHCH_2CH(CH_3)NH_2$ | $OCH_3$ | $CH_3$ | $NHCH_2CH(CH_3)NH_2$ | $NHCH_2CH(CH_3)NH_2$ |
| 6 | $NHC_3H_6N(C_2H_5)_2$ | $OCH_3$ | $CH_3$ | $NHCH_2CH(CH_3)NH_2$ | $NHCH_2CH(CH_3)NH_2$ |
| 7 | $N(C_2H_4OH)_2$ | $OCH_3$ | $CH_3$ | $NHCH_2CH(CH_3)NH_2$ | $NHCH_2CH(CH_3)NH_2$ |
| 8 | $NH_2$ | $OCH_3$ | $CH_3$ | $NHCH_2CH(CH_3)NH_2$ | $NHC_3H_6N(C_2H_5)_2$ |
| 9 | $NH_2$ | $OCH_3$ | $CH_3$ | $NHC_3H_6N(C_2H_5)_2$ | $NHC_3H_6N(C_2H_5)_2$ |
| 10 | OH | $OCH_3$ | $CH_3$ | $NHC_3H_6N(C_2H_5)_2$ | $NHC_3H_6N(C_2H_5)_2$ |
| 11 | $NH_2$ | $CH_3$ | $CH_3$ | $NHCH_2CH(CH_3)NH_2$ | $NHCH_2CH(CH_3)NH_2$ |
| 12 | $NH_2$ | $OCH_3$ | $NHCOCH_3$ | $NHCH_2CH(CH_3)NH_2$ | $NHCH_2CH(CH_3)NH_2$ |
| 13 | OH | $CH_3$ | $CH_3$ | $NHCH_2CH(CH_3)NH_2$ | $NHCH_2CH(CH_3)NH_2$ |
| 14 | $NH_2$ | $OCH_3$ | $OCH_3$ | $NHCH_2CH(CH_3)NH_2$ | $NHCH_2CH(CH_3)NH_2$ |
| 15 | $NH_2$ | $OCH_3$ | $OCH_3$ | $NHC_3H_6N(C_2H_5)_2$ | $NHC_3H_6N(C_2H_5)_2$ |
| 16 | OH | $OCH_3$ | $OCH_3$ | $NHC_3H_6N(C_2H_5)_2$ | $NHC_3H_6N(C_2H_5)_2$ |

EXAMPLE 17

18.4 parts cyanuric chloride were stirred into 20 parts water and 50 parts ice. Thereafter at a temperature of 0–5° C., 26 parts Diethylaminopropylamine are added drop-wise over a period of 3 h. Stirring is continued for 1 h and then the temperature is allowed to rise to 25–30° C. Stirring is continued for a further 5 h at pH 6. Thereafter 70 parts 2-(3'-aminobenzoyl)-amino-5-hydroxy-napthaline-7-sulphuric acid are added. The temperature is brought to 80° C. and held at this temperature for 1 h, the pH being kept at 2–2.5 using 20% Na-carbonate solution. This solution comprises the coupling component having the following formula coupled at pH 4–4.5. After 2 h the pH is brought to pH 9 with 30% NaOH and the precipitated dyestuff is filtered off. A dyestuff of the following formula is obtained

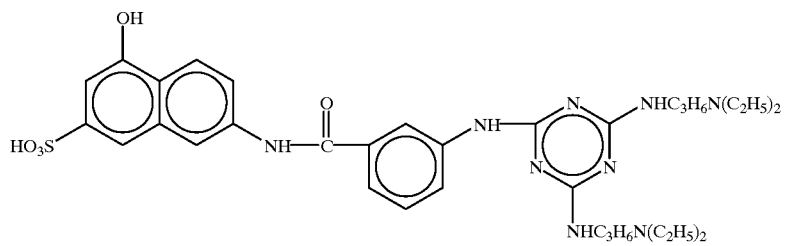

20 parts diazotised 1-amino-2-methoxy-5-methylbenzene-4-sulphuric acid are added thereto and

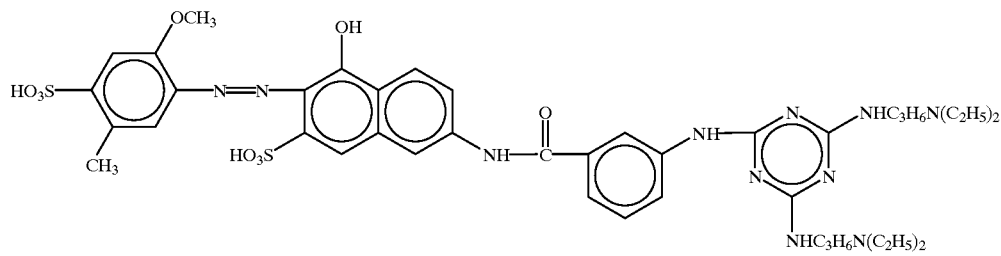

This dyestuff shows very good solubility in dilute acids, especially formic acid. The solution dyes paper in brilliant, neutral red tones. The dyeings obtained show excellent light and wet fastness. Bleachability is perfect.

EXAMPLE 18

Proceeding according to example 17, using however 1,2-diaminopropane and 1-amino-2-methoxy-5-methylbenzene-4-sulfonamide in the place of 1-amino-2-methoxy-5-methylbenzene-4-sulphuric acid and diethylaminopropylamine a dyestuff of the following formula is obtained:

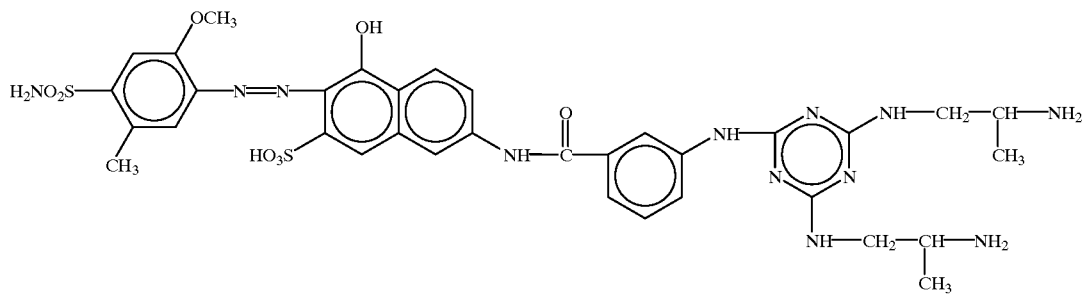

This dyestuff is very soluble in dilute acids. It dyes paper in brilliant scarlet tones. The fastness properties of the paper are excellent.

EXAMPLE 19

The wet press-cake obtained according to Example 1 after filtration, containing ca. 65 parts pure dyestuff, is stirred into 500 parts water and 20 parts formic acid. The dyestuff dissolves completely. The dyestuff solution is evaporated to dryness and a dyestuff in powder form having the formula indicated in Example 1 is obtained. It dissolves excellently in cold water. Other organic acids such as lactic, acetic or methoxyacetic acid or mixtures thereof can be used instead of formic acid can for salt formation.

EXAMPLE 20

The wet press-cake obtained according to Example 1 is added to 40 parts lactic acid and 250 parts water and is dissolved by warming to 50° C. Finally with the help of a filter aid it is clear filtered and made up to 450 parts. A viscous dyestuff solution is obtained which is storable at room temperature for several months and can be used directly or after diluting with water to dye paper in scarlet red nuances.

APPLICATION EXAMPLE A 70 parts chemically bleached sulphite cellulose obtained from pinewood and 30 parts chemically bleached cellulose obtained from birchwood are beaten in 2000 parts water in a Hollander. 0.2 parts of the dyestuff of example 1 are sprinkled into this pulp or 2 parts of the wet dye preparation of example 20 are added thereto. After mixing for 10 mins, paper is produced from this pulp. The absorbent paper obtained in this way is dyed a brilliant scarlet red. The waste water is colorless.

APPLICATION EXAMPLE B 0.2 parts of the dyestuff powder according to Example 1, were dissolved in 100 parts hot water and cooled to room temperature. The solution is added to 100 parts chemically bleached sulphite cellulose which have been ground with 2000 parts water in a Hollander. After 15 minutes thorough mixing resin size and aluminium sulfate are added thereto. Paper produced in this way has a brilliant scarlet red nuance and exhibits perfect light and wet fastness.

APPLICATION EXAMPLE C

An absorbent length of unsized paper is drawn at 40–50° C. through a dyestuff solution having the following composition:

0.3 parts of the dyestuff according to Example 1
0.5 parts of starch and
99.0 parts of water.

The excess dyestuff solution is squeezed out through two rollers. The dried length of paper is dyed a brilliant scarlet red shade.

The dyestuffs of Examples 2 to 19 may also be used for dyeing by a method analogous to that of Application Examples A to C. The paper dyeings obtained show good fastness properties.

APPLICATION EXAMPLE D 0.2 Parts of the dyestuff of Example 1 in acid addition salt form are dissolved in 4000 part of demineralised water at 40° C. 100 Parts of a pre-wetted cotton textile substrate are added, and the bath is raised to the boiling point over 30 minutes and held at the boil for one hour. Any water which evaporates during dyeing is replaced continuously. The dyed substrate is removed form the bath, and after rinsing and drying, a brilliant scarlet red dyeing is obtained having good light-and wet-fastness properties. The dyestuff exhausts practically totally onto the fiber, and the waste water is almost colorless.

In a similar manner as described in Application Example D the dyestuffs according to Examples 2–19 may be used for dyeing cotton.

APPLICATION EXAMPLE E 100 parts freshly tanned and neutralized chrome leather are agitated for 30 minutes in a vessel with a liquor consisting of 250 parts of water at 55° C. and 0.5 parts of the dyestuff of Example 1 in acid addition salt form, and then treated in the same bath for 30 minutes with 2 parts of an anionic fatty licker based on sulphonated train oil. The leather is then dried and prepared in the normal way, giving a leather evenly dyed in a brilliant scarlet red shade.

By a method analogous to that described in Application Example E the dyestuffs according to Examples 2–19 may be used for dyeing leather.

Further vegetable-tanned leathers of low affinity may be dyed using the dyestuffs as described herein in accordance with known methods.

APPLICATION EXAMPLE F

Water is added to a dry pulp in Hollander consisting of 60% (by weight) of mechanical wood pulp and 40% (by weight) of unbleached sulphite cellulose, and the slurry is beaten in order to obtain a dry content slightly exceeding 2.5% and having a beating degree of 40° SR (degrees Schopper-Riegler). The slurry is then exactly adjusted to a high density dry content of 2.5% by adding water.

5 Parts of a 2.5% aqueous solution of the dyestuff according to Example 1 are added to 200 parts of the above resulting slurry. The mixture is stirred for about 5 minutes and, after the addition of 2% (by weight) resin size and then 4% (by weight) alum (based on the dry weight) is further stirred for a few minutes until homogeneous. The resulting pulp is diluted with about 500 parts water to a volume of 700 parts and then used for the production of paper sheets by suction on a sheet former. The resulting paper sheets are dyed a brilliant scarlet red.

By a method analogous to that described in Application Example F any one of the dyestuffs of Examples 2–19 may be used instead of that of Example 1. In all cases, the waste paper exhibits a substantially low residual dye concentration.

APPLICATION EXAMPLE G

Water is added to a dry pulp in a Hollander consisting of 50% (by weight) of chemically bleached sulphite cellulose obtained from pinewood and 50% (by weight) of chemically bleached sulphite cellulose obtained from birchwood, and the slurry is ground until a degree of grinding of 35° SR is reached. The slurry is then adjusted to a high density dry content of 2.5% by adding water, and the pH of this suspension is adjusted to 7.

10 Parts of a 0.5% aqueous solution of the dyestuff mixture adjusted according to Example ? are added to 200 parts of the above resulting slurry, and the mixture is stirred for 5 minutes. The resulting pulp is diluted with 500 parts water and then used for the production of sheets by suction on a sheet former. The paper sheets thus obtained have a brilliant blue shade.

By a method analogous to that described in Application Example G further dye mixtures may be used consisting of any one of the dyestuffs of Examples 2–19. In all cases, paper sheets are formed having a brilliant scarlet red shade.

I claim:

1. A compound of Formula I

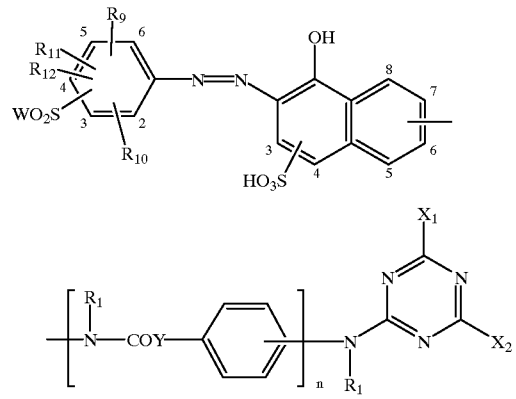

wherein

W is OH or $NR_{13}R_{14}$

Y is NH or a direct bond $R_9$ is OH, Cl, $C_1$–$C_4$alkyl, $C_2$–$C_4$hydroxyalkyl, $C_2$–$C_4$hydroxyalkoxy, $NH_2$, $NO_2$, COOH, COO ($C_1$–$C_4$alkyl), $SO_2NR_{13}R_{14}$, $SO_2OR_1$, $C_1$–$C_4$alkoxy $R_{10}$ is Cl, $C_1$–$C_4$alkyl, $C_1$–$C_4$alkoxy, NHCO—$C_{1-4}$alkyl, $NO_2$ $R_{11}$ is H, $CH_3$ $R_{12}$ is H, $CH_3$, Cl $R_{13}$ is H, phenyl, cycloalkyl or $C_1$–$C_6$alkyl optionally substituted by $NR_{16}R_{17}$ or OH;

$R_{14}$ is H, $C_1$–$C_6$alkyl, optionally substituted by $NR_5R_6$ or OH each $R_1$ is independently H, $C_1$–$C_4$alkyl optionally monosubstituted by OH n is 0 or 1

$X_1$ and $X_2$ independently of each other is an aliphatic, cycloaliphatic, aromatic or heterocyclic amino group, said amino group comprising a protonatable nitrogen atom or a quaternary ammonium group, and being an aliphatic, cycloaliphatic, aromatic or heterocyclic mono($C_{1-4}$alkyl)-amino group, the $C_{1-4}$alkyl- group being unsubstituted or monosubstituted by halogen, $C_{1-4}$alkyl, $C_{1-4}$alkoxy, phenyl or hydroxy; an aliphatic, cycloaliphatic, aromatic or heterocyclic di($C_{1-4}$alkyl)-amino group, the $C_{1-4}$alkyl- groups being independently unsubstituted or monosubstituted by halogen, $C_{1-4}$alkyl, $C_{1-4}$alkoxy, phenyl or hydroxy; a $C_{5-6}$cycloalkylamino group, the cycloalkyl group being unsubstituted or substituted by one or two $C_{1-2}$alkyl groups; a phenylamino group, the phenyl ring being, unsubstituted or substituted by one or two groups selected from halogen, $C_{1-4}$alkyl, $C_{1-4}$alkoxy, hydroxy and phenoxy; or a 5- or 6-membered ring containing one or two hetero atoms, in addition to N, O or S, which heterocyclic ring is unsubstituted or substituted by one or two $C_{1-4}$alkyl groups; or a group Z, where Z is independently selected from

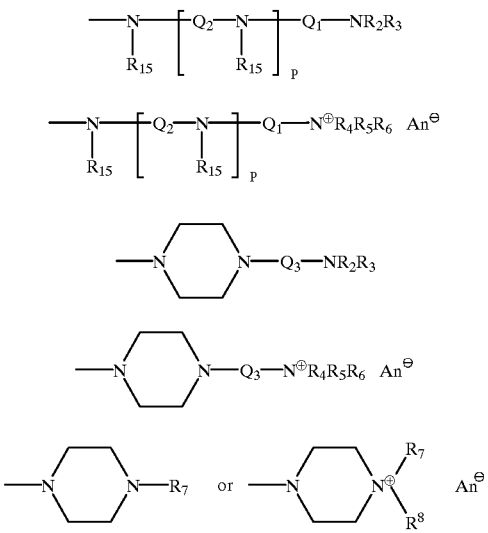

where
p is 0 or an integer 1, 2 or 3,
each $R_{15}$ is independently hydrogen, unsubstituted $C_{1-4}$alkyl or $C_{1-4}$alkyl monosubstituted by hydroxy, halogen, cyano or $C_{1-4}$alkoxy,
each $R_2$ and $R_3$ is independently hydrogen, unsubstituted $C_{1-6}$alkyl, $C_{2-6}$alkyl monosubstituted by hydroxy or cyano, phenyl or phenyl-$C_{1-4}$alkyl, where the phenyl ring of the latter two groups is unsubstituted or substituted by one to three groups selected from chlorine, $C_{1-4}$alkyl, $C_{1-4}$alkoxy, unsubstituted $C_{5-6}$cycloalkyl or $C_{5-64}$cycloalkyl substituted by one to three $C_{1-4}$alkyl groups, or a pyridinium ring, or
$R_2$ and $R_3$ together with the nitrogen atom to which they are attached, form a 5- or 6-membered ring containing one to three hetero atoms (in addition to N, one or two further N, O or S), which heterocyclic ring is unsubstituted or substituted by one or two $C_{1-4}$alkyl groups,
each $R_4$ and $R_5$ has independently one of significances of $R_2$ and $R_3$, except hydrogen
$R_6$ is $C_{1-4}$alkyl or benzyl with the exception that $R_6$ is not benzyl when $R_4$ and $R_5$ have one of the cyclic significations of $R_2$ and $R_3$ or
$R_4$, $R_5$ and $R_6$ together with the nitrogen atom to which they are attached, form a pyridinium ring which is unsubstituted or substituted by one or two methyl groups,
$Q_1$ is $C_{2-8}$alkylene, $C_{3-6}$alkylene substituted by one or two hydroxy groups, $C_{1-6}$alkylene-1,3- or 1,4-phenylene, or —*NHCOCH$_2$, where * denotes the atom bound to —NR$_{15}$
$Q_2$ is $C_{2-8}$alkylene, $C_{3-6}$alkylene substituted by one or two hydroxy groups, $C_{1-6}$alkylene-1,3- or -1,4-phenylene or 1,3- or 1,4-phenylene,
$Q_3$ is $C_{2-8}$alkylene,
$R_7$ is hydrogen, unsubstituted $C_{1-6}$alkyl or $C_{1-6}$alkyl monosubstituted by hydroxy, cyano, chlorine or phenyl,
$R_8$ is unsubstituted $C_{1-6}$alkyl or $C_{1-6}$alkyl monosubstituted by hydroxy, cyano or chlorine, and
An$^\ominus$ is a non-chromophoric anion;
$R_{16}$ and $R_{17}$ is independently hydrogen, unsubstituted $C_{1-4}$alkyl, $C_{1-4}$alkyl monosubstituted by hydroxy or cyano, phenyl or phenyl-$C_{1-4}$alkyl, where the phenyl ring of the latter two groups is unsubstituted or substituted by one to three groups selected from chlorine, $C_{1-4}$alkyl, $C_{1-4}$alkoxy, unsubstituted $C_{5-6}$cycloalkyl or $C_{5-6}$cycloalkyl substituted by one to three $C_{1-4}$alkyl groups, a primary, secondary or tertiary amino-$C_{1-4}$alkyl group, or a pyridine ring, which optionally is substituted,
the compounds being in internal or external salt form.

2. A compound according to claim 1, wherein n is 0.

3. A compound according to claim 1 wherein $R_1$ is $R_{1a}$, each $R_{1a}$ independently being hydrogen, methyl, ethyl or 2-hydroxy-ethyl.

4. A compound according to claim 1 wherein the $R_9$ and $R_{10}$ on the phenyl ring attached to the azo group, are independently selected from the group consisting of $CH_3$, $OCH_3$, $OC_2H_5$, Cl, $NO_2$.

5. A compound according to claim 1 wherein each group $X_1$ and $X_2$ is a group $Z_a$, wherein each $Z_a$ is independently a group selected from

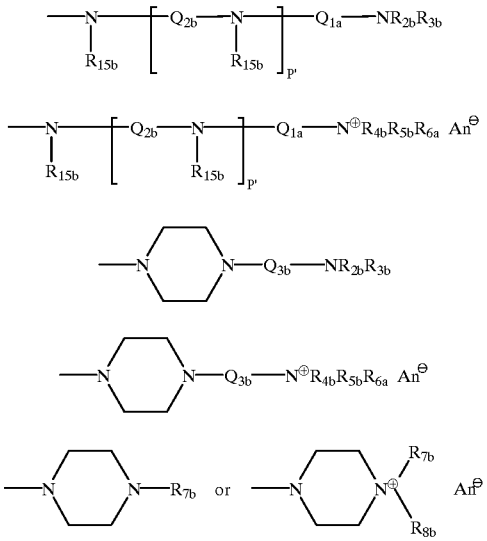

in which
p' is 0 or 1,
$R_{15b}$ is hydrogen, methyl or 2-hydroxyethyl,
$Q_{1a}$ is —*NHCOCH$_2$-, wherein *denotes the atom bound to —NR$_{15b}$, unsubstituted $C_{2-6}$alkylene, monohydroxy-substituted $C_{3-4}$akylene, —(CH$_2$)$_{1-4}$-1,3- or -1,4-phenylene, or 1,3-or 1,4-phenylene,
each $Q_{2b}$ and $Q_{3b}$ is a linear $C_{2-6}$alkylene group,
each $R_{2b}$ and $R_{3b}$ is independently hydrogen, unsubstituted $C_{1-4}$alkyl or 2-hydroxethyl, or a pyridinium ring,
each $R_{4b}$ and $R_{5b}$ is independently unsubstituted C1-4alkyl or 2-hydroxy-ethyl and $R_{6a}$ is $C_{1-4}$alkyl or benzyl or
$R_{4b}$, $R_{5b}$ and $R_{6a}$ together with the nitrogen to which they are attached form a pyridinium ring which is unsubstituted or substituted by one or two methyl groups,
$R_{7b}$ is hydrogen, methyl, ethyl or 2-hydroxyethyl,
$R_{8b}$ is methyl, ethyl or 2-hydroxyethyl, and
An$^\ominus$ is a non-chromophoric anion.

6. A composition comprising a compound as claimed in claim 1.

7. A substrate which has been dyed or printed with a compound as claimed in claim 1.

8. A method of dyeing or printing a substrate by applying thereto a compound as claimed in claim 1.

9. A process for the preparation of a compound of formula I as claimed in claim 1 comprising reacting the diazonium salt of an amine of formula II, having the following formula:

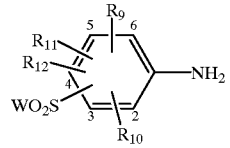

II with a compound of formula III, having the following formula:

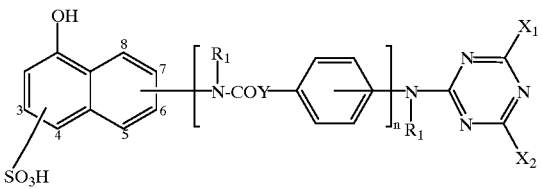

III in which $WO_2S$, $R_1$, $R_9$, $R_{10}$, $R_{11}$, $R_{12}$, Y, $X_1$ and $X_2$ are as defined in claim 1.

* * * * *